United States Patent

[11] 3,545,601

| [72] | Inventor | Fred D. Cressman<br>Waterloo, Ontario, Canada |
|---|---|---|
| [21] | Appl. No. | 753,633 |
| [22] | Filed | Aug. 19, 1968 |
| [45] | Patented | Dec. 8, 1970 |
| [73] | Assignee | Canada Barrels & Kegs Limited<br>Waterloo, Ontario, Canada<br>a corporation of Canada |

[54] CONVEYOR BRACKET
1 Claim, 3 Drawing Figs.

[52] U.S. Cl. .................................................. 198/192
[51] Int. Cl. .............................................. B65g 15/08
[50] Field of Search .................................... 198/192,
204; 161/(Glass Fibers Digest); 74/(Inquired)

[56] References Cited
UNITED STATES PATENTS

| 2,528,235 | 10/1950 | Loritsch | 161/(GFD) |
| 2,617,126 | 11/1952 | Nebesar | 161/(GFD) |
| 2,746,891 | 5/1956 | Doane | 161/(GFD) |
| 3,207,291 | 9/1965 | Barnish | 198/192 |

Primary Examiner—Edward A. Sroka
Attorney—George H. Riches

ABSTRACT: A molded one piece conveyor bracket which is made of a laminate consisting of fiberglass and resin and a method of making the laminate in separately molded pieces and then bonding them together to form the one piece bracket.

PATENTED DEC 8 1970

INVENTOR
FRED D. CRESSMAN

By

Attorney

CONVEYOR BRACKET

BACKGROUND OF THE INVENTION

Conveyor belt brackets have heretofore been made of iron (conventional steel) and have several disadvantages. One of the problems met with the prior type of conveyor bracket is that they are or may be subjected to an overload and because of their lack of resilience would bend and remain in the bent position after the load was removed.

A further problem with the foregoing brackets was that they were magnetic and thus could not be used with magnetic automatic weighing equipment.

A further problem resided in the fact that they were not resistant to corrosion and corrosive type chemicals.

OUTLINE OF THE INVENTION

The foregoing and other problems have been solved by the conveyor bracket of the present invention. The bracket of the present invention is highly resistant to corrosion and chemicals; it is light in weight and while rigid, is resilient so that even if subjected to considerable overload will readily spring back to its normal position when the overload condition has been removed. A further advantage of the present invention is that it is nonmagnetic and therefore can be utilized with magnetic automatic weighing equipment.

The conveyor bracket of the present invention comprises:
a. a molded basemember consisting of a laminate of fiberglass bonded by resin to support a load carrying idler;
b. brackets at each end in spatial relationship supported by said base and arranged to support a center idler and an angularly disposed idler on each side thereof; each bracket consisting of a laminate of fiberglass and resin;
c. said members being bonded at their relative positions by fiberglass and resin; and
d. a final covering of fiberglass and resin bonding all members into the one piece conveyor bracket.

The method of constructing the bracket of the present invention comprises the steps of:
a. forming molds for each of a basemember, idler support members and bracing members;
b. cutting the fiberglass to the pattern of the respective molds;
c. applying the fiberglass patterns to the respective molds and making a laminate consisting of fiberglass and resin;
d. assembling the members and bonding them together with resin to form said conveyor bracket; and
e. covering the assembled members with a final covering of fiberglass and resin to form the one piece conveyor bracket.

DESCRIPTION OF THE INVENTION

For the purpose of illustrating the construction of the bracket of this invention and the method of making the same, one embodiment of the invention is shown in the accompanying drawings in which.

Figure 1:
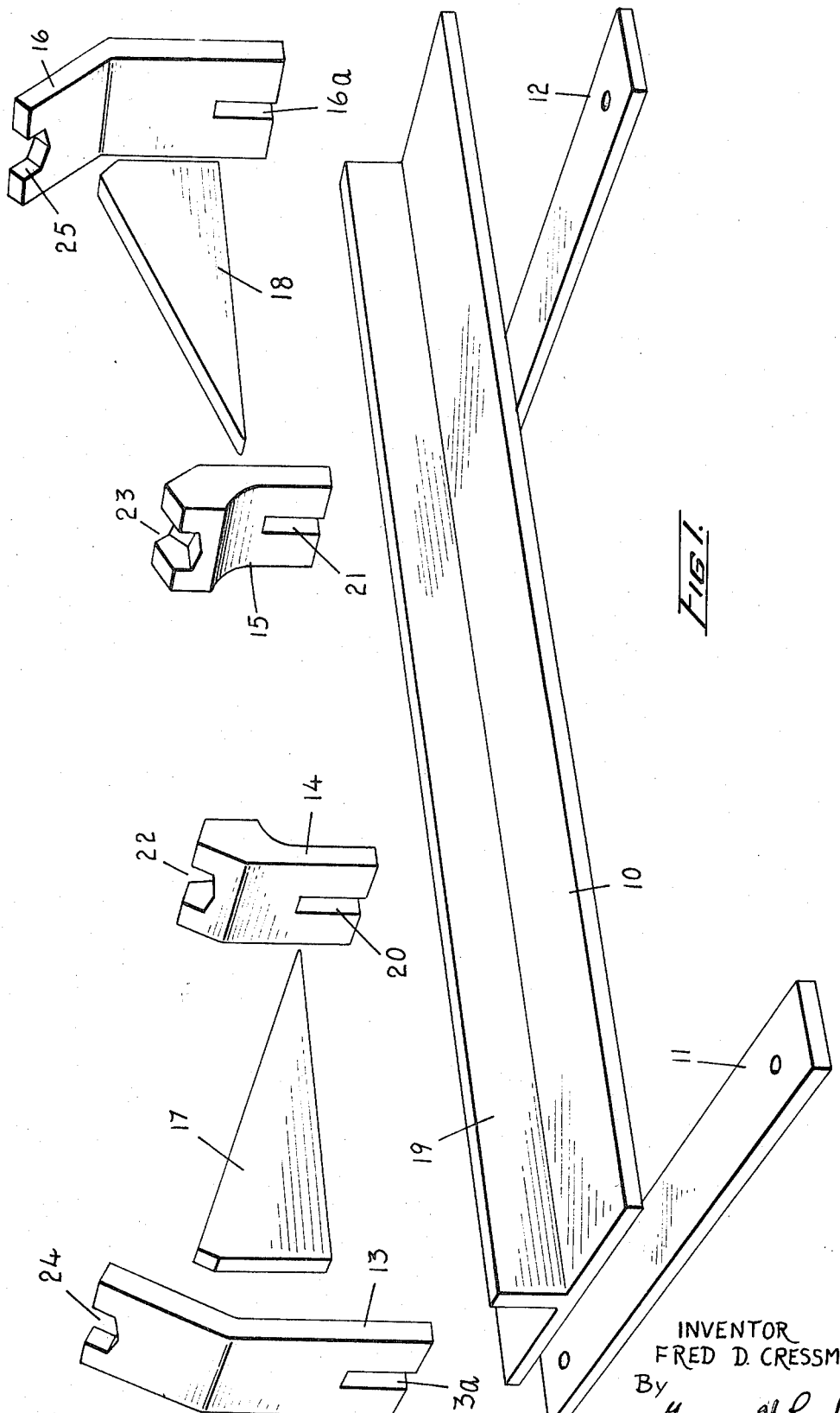
FIG. 1 shows the molded members in their relative position just prior to assembly.

The conveyor bracket comprises a base member 10 in the form of a T-bar, mounting cross plates 11, 12 on which the base plate 10 is supported and by means of which the bracket is mounted in position; for support posts 13, 14, 15 and 16 and webs 17, 18.

It will be seen from the drawings that the posts 13, 16 are identical; the posts 14, 15 are identical and the webs 17, 18 are identical. The base member is formed in the shape of a T-bar so that it has a ridge 19 extending along the longitudinal axis thereof. The posts are notched as indicated at 13a, 16a to receive ridge 19 therein.

The central two posts 14, 15 are narrow at the bottom, the bottom portion being formed with deep slots 20, 21 which fit over the ridge 19. The top portion of each of the posts 14, 15 are substantially wide and are notched as indicated at 22, 23 so that the axials of the idlers can be supported therein as hereinafter described.

The outside posts 13, 16 are longer than the other two posts and are curved inwardly to support the outside rolls at an angle. The top end of each of the outside posts 13, 16 are similarly notched as indicated at 24, 25 to support the outside end of the sloping rolls.

It will be seen from the drawings that the posts 13, 16 are identical, the posts 14, 15 are identical and the webs 17, 18 are identical. Consequently it is only necessary to prepare one mold for each of the members 10, 13, 14 and 17. The cross members 11, 12 being straight lined do not require a mold.

The webs 17, 18 are fitted between each pair of outside and inside posts and to the top of the ridge 19. It will be noted that the broad outside end of the webs 17, 18 abut against the posts 13, 16 respectively and when bonded thereto as herein described the bracket becomes very strong and rigid but it does have sufficient resilience to flex under load without distortion.

Figure 2:
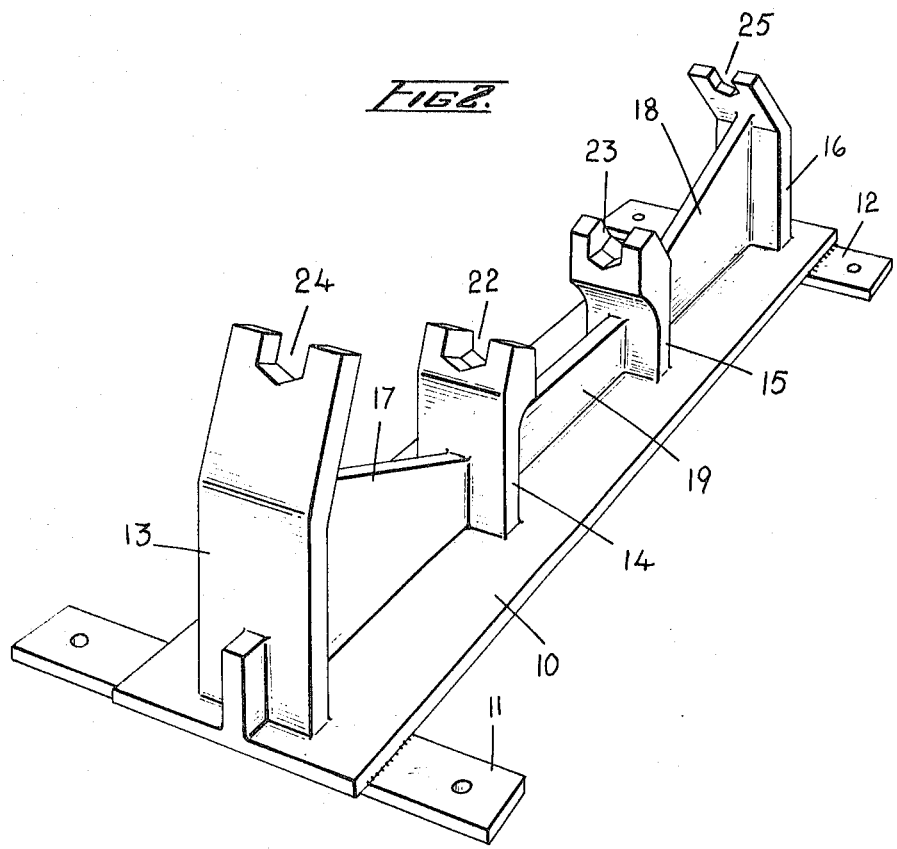
FIG. 2 shows the completed bracket.

The fiberglass material is cut to the pattern of the respective molds. A suitable resin for making the laminate is selected from the group consisting of polyesters, epoxies and vinyl esters. The required laminate is applied in the usual manner preferably using approximately 45 percent fiberglass and 55 percent resin. When the laminate is completed, the parts are taken from the mold and sanded to prepare them for assembly. The parts are then assembled in a jig to position them in their correct and final position which is shown in FIG. 2. The parts are then bonded together by a laminate of fiberglass and resin. When that step is completed a final covering of fiberglass and resin is applied over all the parts to bond them into a single unit. After a final sanding to remove all sharp edges a final coat of resin is applied to yield a resin rich surface over the entire bracket.

Figure 3:
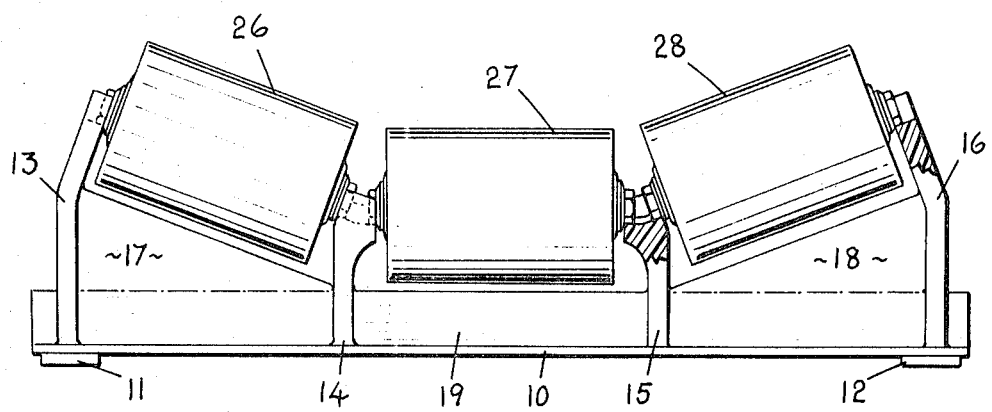
FIG. 3 shows the bracket complete with conveyor idlers mounted thereon.

FIG. 3 illustrates the bracket having mounted thereon three conveyor idlers 26, 27 and 28.

The base plate, in the drawings, is shown as having a substantially perpendicular ridge 11. It is, of course, evident that the ridge can be made in other shapes such as a gablelike ridge. It is therefore to be understood that the claims of the present invention are not restricted to the particular shape or particular embodiment illustrated in the drawings.

I claim:

1. A one-piece corrosion-free, conveyor bracket consisting of:
a. an elongated basemember of plate-like shape having an upstanding central flange extending the full length of the basemember and consisting of a laminate of fiberglass and resin adapted to support load carrying idlers;
b. an elongated cross-plate at each of the basemembers, said cross-plate being attachable to fixed support;
c. idler support brackets consisting of a pair of central brackets and a bracket at each end in spatial relationship supported by said base and arranged to support a center idler in a plane substantially parallel to the base member and an angularly disposed idler on each side of the center idler; each bracket consisting of a laminate of fiberglass and resin and having a flange receiving slot in the body section thereof;
d. a right-angled triangular shaped web located between each end bracket and the contiguous central bracket, said web having one side abutting against the top edge of the flange and its base abutting the respective end bracket whereby the end brackets are braced against displacement;
e. said brackets being permanently secured to the basemember at their relative positions by a laminate of fiberglass and resin; and f. an outer covering of fiberglass and resin over the basemember idler support brackets and the webs whereby the several components are bonded together into the one-piece corrosion-free conveyor bracket.